United States Patent
Rothe et al.

(10) Patent No.: US 11,262,502 B2
(45) Date of Patent: Mar. 1, 2022

(54) RECEIVING DEVICE AND METHOD FOR DETERMINING TRANSMISSION CHARACTERISTICS OF AN OPTICAL WAVEGUIDE

(71) Applicant: Technische Universitat Dresden, Dresden (DE)

(72) Inventors: Stefan Rothe, Dresden (DE); Qian Zhang, Dresden (DE); Nektarios Koukourakis, Freital (DE); Robert Kuschmierz, Dresden (DE); Jurgen Czarske, Dresden (DE)

(73) Assignee: Technische Universitat Dresden, Dresden (DE)

( * ) Notice: Subject to any disclaimer, the term of this patent is extended or adjusted under 35 U.S.C. 154(b) by 0 days.

(21) Appl. No.: 17/376,320

(22) Filed: Jul. 15, 2021

(65) Prior Publication Data
US 2022/0019024 A1  Jan. 20, 2022

(51) Int. Cl.
*G02B 6/14* (2006.01)
*G01M 11/00* (2006.01)
(Continued)

(52) U.S. Cl.
CPC .............. *G02B 6/14* (2013.01); *G01M 11/30* (2013.01); *G06N 3/02* (2013.01); *H04J 14/04* (2013.01)

(58) Field of Classification Search
CPC . G02B 6/14; G01M 11/30; G06N 3/02; H04J 14/04
(Continued)

(56) References Cited

U.S. PATENT DOCUMENTS 4,070,094 A * 1/1978 Martin ................... G02F 1/225
                                                        385/16
4,950,042 A * 8/1990 Gaylor ................. G02F 1/2955
                                                        385/14
(Continued)

FOREIGN PATENT DOCUMENTS

WO   2020/020991   1/2020

OTHER PUBLICATIONS

Office Action issued by the German Patent Office for application No. 10 2020 118 871.4, dated Feb. 25, 2021. English translation included.

*Primary Examiner* — Kaveh C Kianni
(74) *Attorney, Agent, or Firm* — Barnes & Thornburg; Jeffrey R. Stone

(57) ABSTRACT

A receiving apparatus and method for determining transmission characteristics of an optical waveguide in which the receiving apparatus includes a waveguide interface for receiving a mixed light beam having a plurality of modes from a multi-mode optical waveguide and for receiving a blended shifted light beam from the multimode optical waveguide, wherein the mixed light beam has an associated phase for each mode of the plurality of modes, and wherein the mixed shifted light beam has an associated shifted phase for each mode of the plurality of modes; and one or more processors for determining mode information for the intermixed light beam and shifted mode information for the intermixed shifted light beam using a trained neural network and for determining, for each mode of the plurality of modes, the respective associated phase using the intermixed shifted light beam.

13 Claims, 13 Drawing Sheets

(51) Int. Cl.
*G06N 3/02* (2006.01)
*H04J 14/04* (2006.01)

(58) Field of Classification Search
USPC .......................................................... 356/73
See application file for complete search history.

(56) References Cited

U.S. PATENT DOCUMENTS

| | | | | |
|---|---|---|---|---|
| 5,044,712 A * | 9/1991 | Soret | ..................... | G02F 1/1326 385/16 |
| 5,142,394 A * | 8/1992 | Asada | ..................... | G02B 27/28 349/194 |
| 5,274,720 A * | 12/1993 | Yamamoto | ............... | G02B 6/10 359/569 |
| 5,357,591 A * | 10/1994 | Jiang | .................. | G02B 6/29325 359/566 |
| 5,933,554 A * | 8/1999 | Leuthold | ................. | G02F 2/004 385/28 |
| 6,084,992 A * | 7/2000 | Weber | ................ | G02B 6/12033 385/24 |
| 7,376,309 B2 * | 5/2008 | Guide | ................ | G02B 6/12007 385/39 |
| 7,406,226 B1 * | 7/2008 | Horst | ................. | G02B 6/12007 372/94 |
| 7,474,825 B1 * | 1/2009 | Horst | ................. | G02B 6/12007 372/94 |
| 8,473,539 B1 * | 6/2013 | Rao | ........................ | G06F 17/16 708/522 |
| 10,641,954 B2 * | 5/2020 | Clements | ................ | G06F 30/00 |
| 2002/0044724 A1 * | 4/2002 | Okayama | ............... | G02B 6/124 385/24 |
| 2004/0239943 A1 * | 12/2004 | Izatt | ................... | G01B 9/02004 356/479 |
| 2006/0039061 A1 * | 2/2006 | Chi | ...................... | H01S 3/0915 359/333 |
| 2006/0045809 A1 * | 3/2006 | Shirai | .............. | G01N 33/54373 422/82.11 |
| 2006/0127024 A1 * | 6/2006 | Smith | ................... | G02B 6/124 385/132 |
| 2007/0201796 A1 * | 8/2007 | Guide | ................ | G02B 6/12007 385/39 |
| 2011/0206318 A1 * | 8/2011 | Dragone | ............. | G02B 6/12021 385/24 |
| 2012/0224807 A1 * | 9/2012 | Winzer | ............. | H04B 10/2581 385/28 |
| 2014/0299743 A1 * | 10/2014 | Miller | ................... | G02F 1/0136 250/204 |
| 2014/0300695 A1 * | 10/2014 | Smalley | ................... | G03H 1/02 348/40 |
| 2016/0112192 A1 * | 4/2016 | Earl | ..................... | H04L 9/0852 380/44 |
| 2018/0031689 A1 * | 2/2018 | Ben-Ari | .............. | G01S 13/4454 |
| 2018/0120085 A1 * | 5/2018 | Lane | ................ | G01B 9/02027 |
| 2021/0349018 A1 * | 11/2021 | Venkatarayalu | ... | G01N 21/7703 |

* cited by examiner

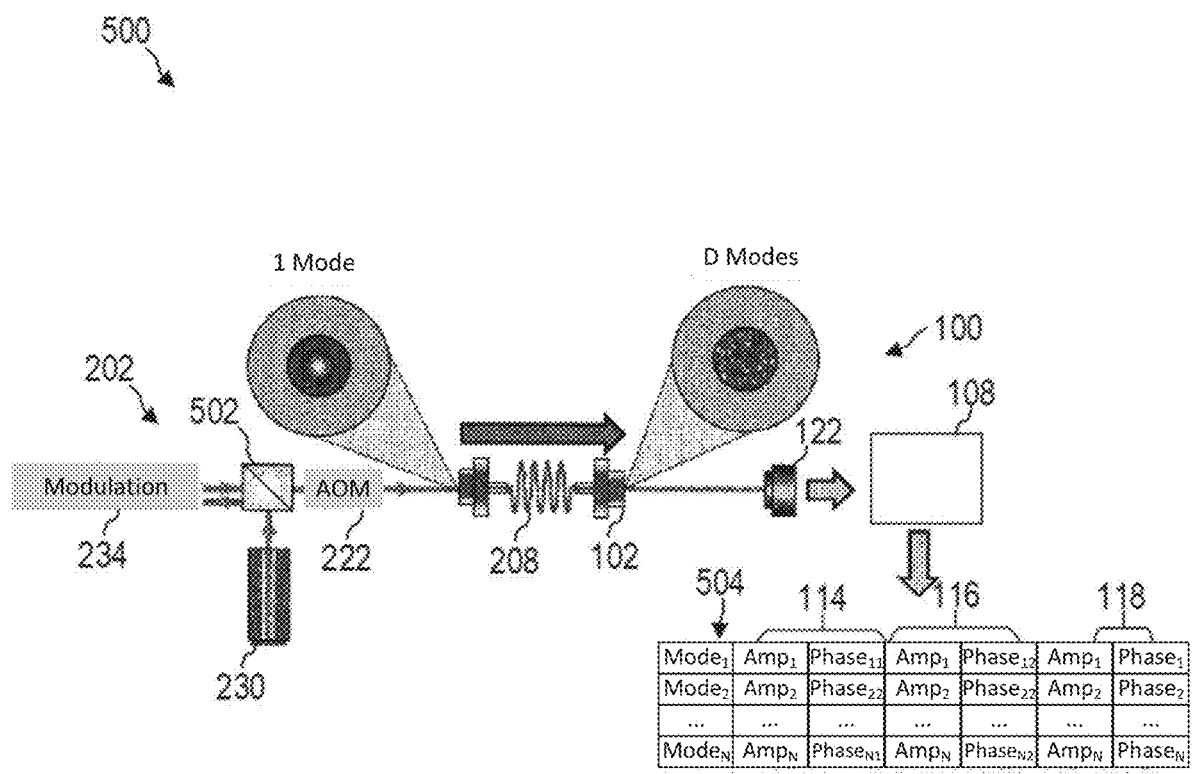

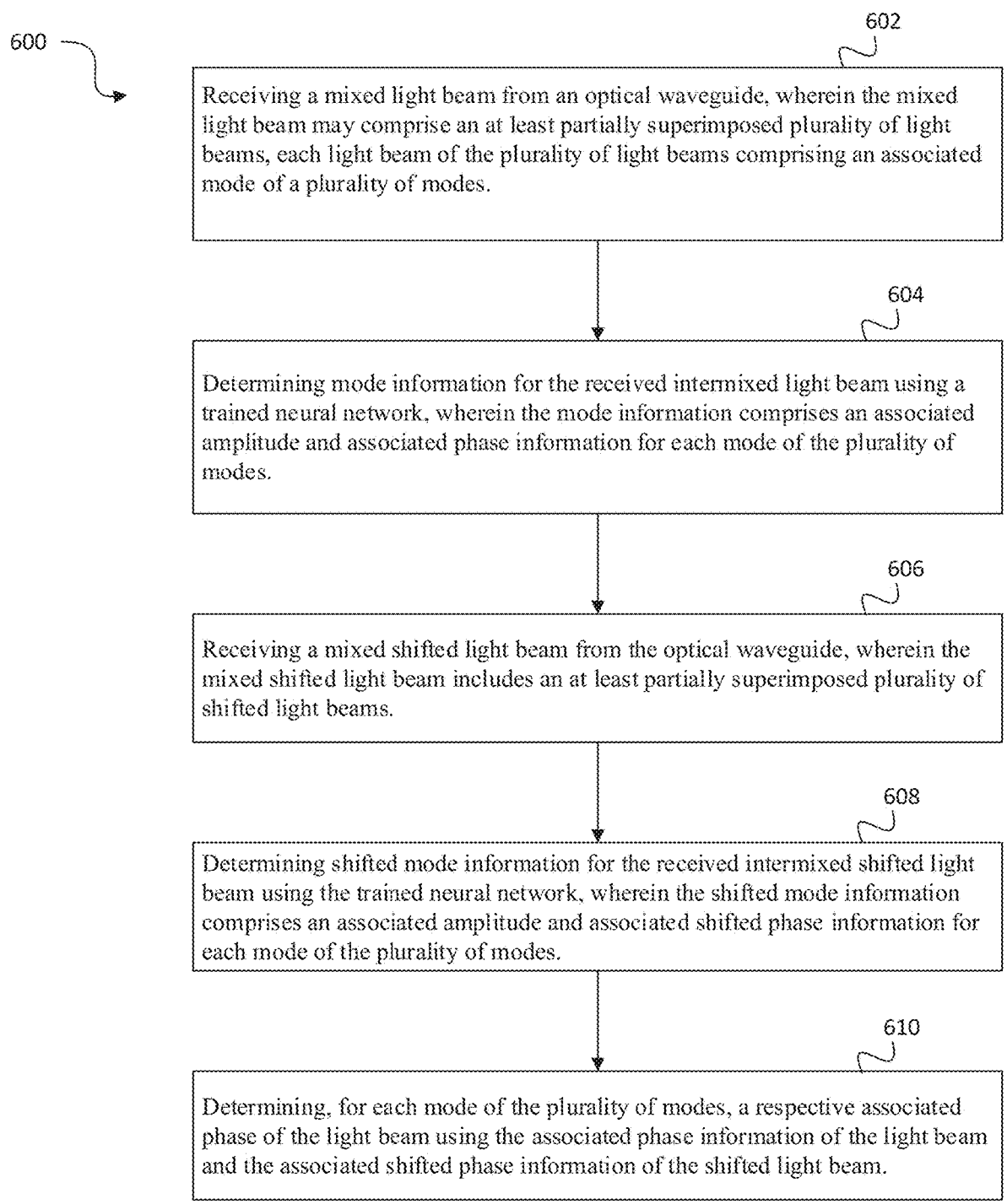

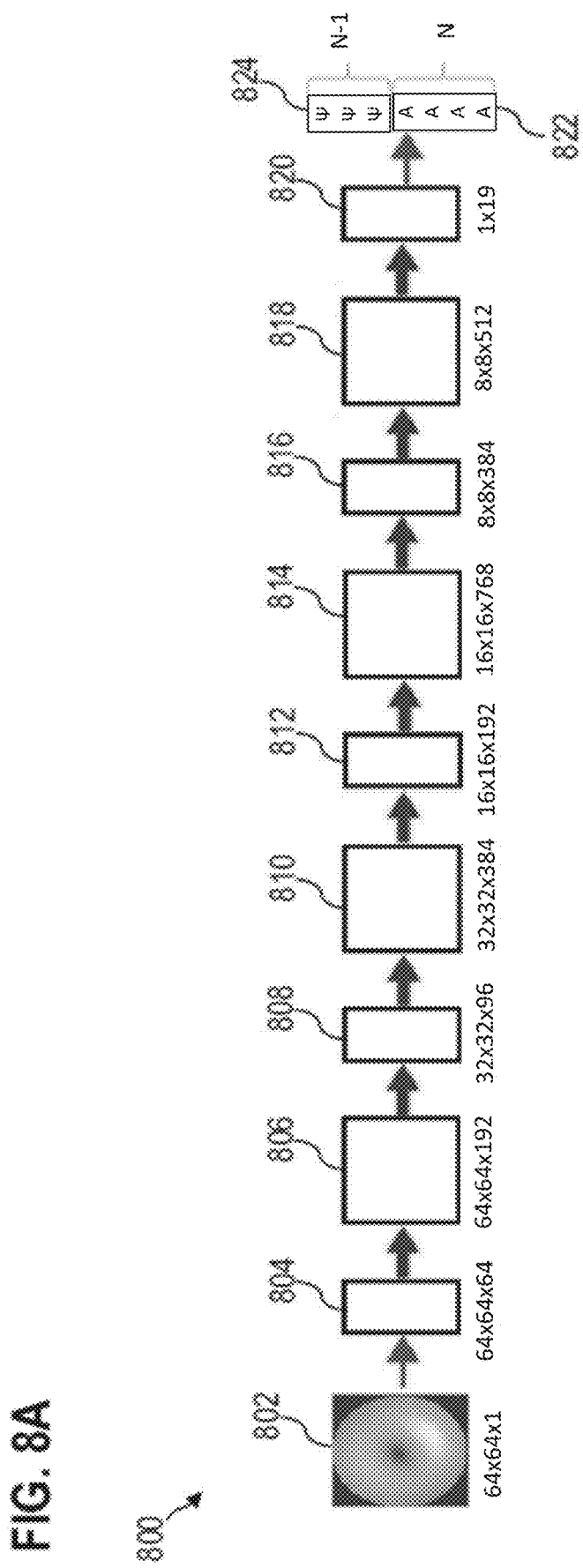

RECEIVING DEVICE AND METHOD FOR DETERMINING TRANSMISSION CHARACTERISTICS OF AN OPTICAL WAVEGUIDE

CROSS-REFERENCE TO RELATED APPLICATIONS

This application claims priority to German Patent Application 10 2020 118 871.4, which was filed on Jul. 16, 2020, the entirety of which is in hereby incorporated herein by reference.

TECHNICAL FIELD

Various embodiments relate to a receiving device, a method for determining transmission characteristics of an optical waveguide, and a method for computer-based training of a neural network.

BACKGROUND

In general, data can be transmitted in various ways, with the physical layer defining and/or providing an interface to the medium or media for data transmission. Various methods are used to increase information security with the physical layer. For example, data can be transmitted in the form of light using multi-mode optical waveguides. When light beams are transmitted using a multi-mode optical waveguide, the light beams overlap or mix. This can increase the security of the physical layer. However, this requires that the transmission properties of the optical waveguide are characterized, for example using a calibration in which the transmission properties of the optical waveguide are measured and summarized in a transmission matrix. The transmission properties may be measured, for example, using digital holography. In digital holography, the mixed light beams on a receiving side of the optical waveguide are constructively superimposed with a separate coherent reference light beam so that an interference pattern is produced, the transmission matrix for the interference pattern being determined by a computer algorithm. Thus, digital holography requires an additional optical path for the reference light beam.

BRIEF DESCRIPTION OF FIGURES

FIG. 5 shows system according to various embodiments;

FIG. 6 shows a method for determining transmission characteristics of an optical waveguide according to various embodiments;

FIG. 8A shows neural network according to various embodiments;

DETAILED DESCRIPTION

Figure 1A:
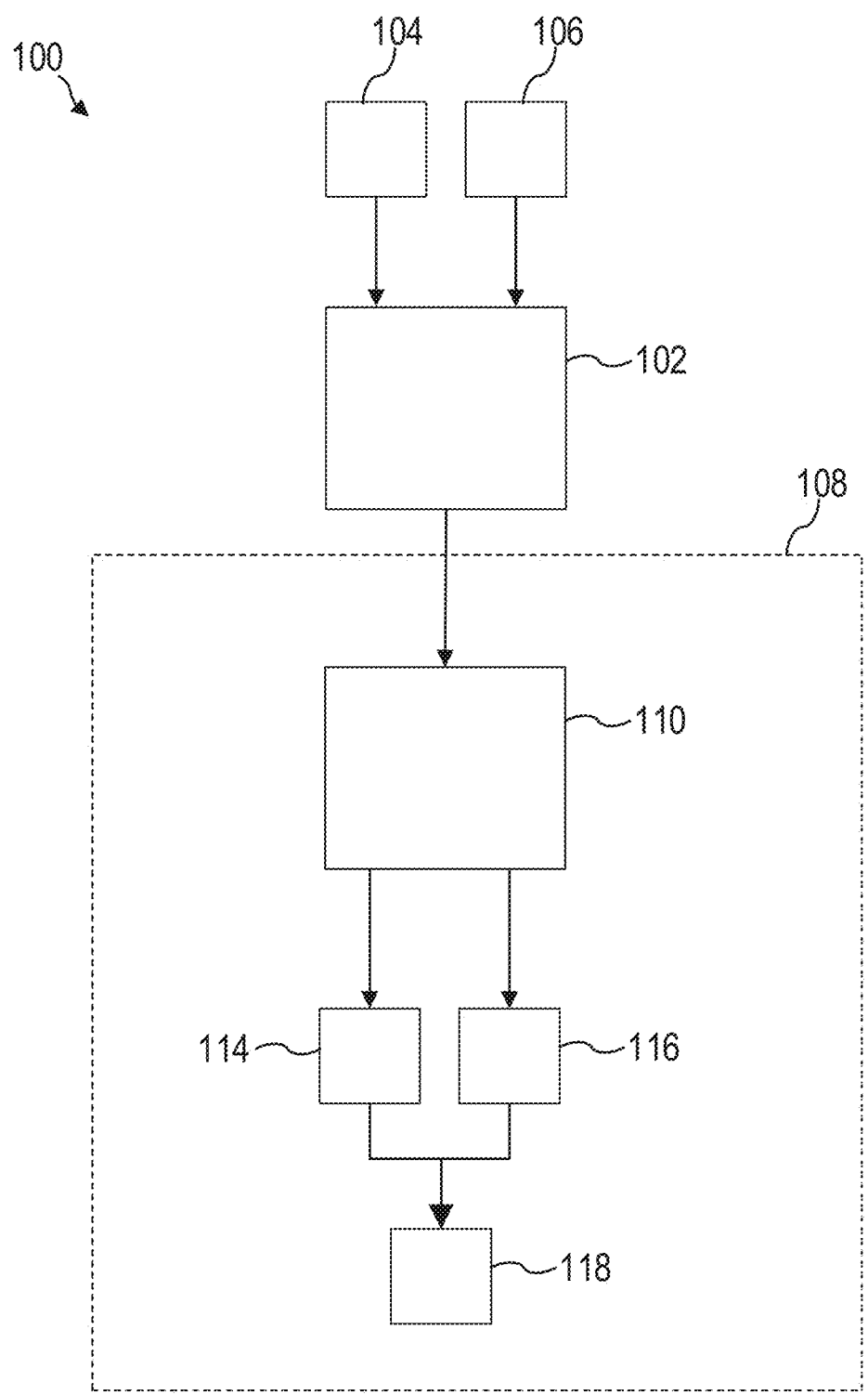
FIGS. 1A and 1B show a receiving device according to various embodiments.

In light of the above background, it may be necessary to provide a receiving device and method for determining transmission characteristics of an optical waveguide that does not require a reference light beam. Furthermore, it may be necessary to provide a receiving device and a method for determining transmission characteristics of an optical waveguide with which a transmission matrix can be determined with reduced computational effort.

According to various embodiments, a receiving device and a method for determining transmission characteristics of an optical waveguide are provided, by which a transmission matrix can be determined without a reference light beam and with reduced computational effort.

According to various embodiments, a receiving device includes: a waveguide interface configured to: receiving an intermixed light beam from a multimode optical waveguide, the intermixed light beam including an at least partially superimposed plurality of light beams, each light beam of the plurality of light beams having an associated one of a plurality of modes having an associated amplitude and an associated phase; receiving an intermixed shifted light beam from the multimode optical waveguide, wherein the intermixed shifted light beam includes an at least partially superimposed plurality of shifted light beams, each shifted light beam of the plurality of shifted light beams being associated with a light beam of the plurality of light beams, the shifted light beam associated with a respective light beam having the associated mode with the associated amplitude and an associated shifted phase, wherein the shifted phase is different from the phase of the light beam and one or more processors configured to: determine mode information for the intermixed light beam using a trained neural network, the mode information for each mode of the plurality of modes including the associated amplitude and associated phase information; determine shifted mode information for the intermixed shifted light beam using the trained neural network, wherein the shifted mode information for each mode of the plurality of modes includes the associated amplitude and associated shifted phase information; and determine, for each mode of the plurality of modes, the respective associated phase of the light beam using the associated phase information of the light beam and the associated shifted phase information of the shifted light beam.

The receiving device with the features of independent claim 1 forms a first example.

Determining the mode information using the trained neural network can result in no reference light beam being required. Thus, no second optical waveguide is required. The transmission of shifted light beams (e.g. phase-shifted light beams) in combination with the determination of the shifted mode information can lead to the respective phase of each light beam being determinable with comparatively low computational effort.

The receiving device may further include an imaging device that is configured to provide light image data for the received mixed light beam. The features described in this paragraph in combination with the first example form a second example.

Determining mode information for the blended light beam may include determining mode information for the light image data using the trained neural network. The features described in this paragraph in combination with the second example form a third example.

The light image data may have real-value intensity distributions. The features described in this paragraph in combination with the second example or the third example form a fourth example.

The imaging device may be further configured to provide shifted light image data for the received blended shifted light beam. The features described in this paragraph in combination with one or more of the second example to the fourth example form a fifth example.

Determining shifted mode information for the blended shifted light beam may include determining shifted mode information for the shifted light image data using the trained neural network. The features described in this paragraph in combination with the fifth example form a sixth example.

The shifted light image data may have real-value intensity distributions (e.g., amplitude images having real-value intensity distributions). The feature described in this paragraph in combination with the fifth example or the sixth example forms a seventh example.

Each light beam of the plurality of light beams may have a respective first frequency, and the shifted light beam associated with a respective light beam may have a second frequency, the second frequency being different from the first frequency. The features described in this paragraph in combination with one or more of the first example to the seventh example form an eighth example.

The phase information of a respective light beam of the plurality of light beams may have a cosine value of the associated phase. The features described in this paragraph in combination with one or more of the first example to the eighth example form a ninth example.

The shifted phase information of a respective shifted light beam of the plurality of shifted light beams may have a cosine value of the associated shifted phase. The features described in this paragraph in combination with one or more of the first example to the ninth example form a tenth example.

The determining, for each mode of the plurality of modes, the respectively associated phase of the light beam using the associated phase information of the light beam and the associated shifted phase information of the shifted light beam may have a determining, for each mode of the plurality of modes, the respectively associated phase of the light beam using the cosine value of the associated phase of the light beam and the cosine value of the associated shifted phase of the shifted light beam. The features described in this paragraph in combination with the ninth example and the tenth example form an eleventh example.

The determining, for each mode of the plurality of modes, of the respective associated phase of the light beam using the cosine value of the associated phase of the light beam and the cosine value of the associated shifted phase of the shifted light beam may include determining, for each mode of the plurality of modes, the respective associated phase of the light beam using a change in direction between the cosine value of the associated phase of the light beam and the cosine value of the associated shifted phase of the shifted light beam. The features described in this paragraph in combination with the eleventh example form a twelfth example.

The respective associated phase of the light beam may be determined for the cosine value of the associated phase of the light beam using the arc cosine function, and the change in direction may indicate the sign of the arc cosine function. The features described in this paragraph in combination with the twelfth example form a thirteenth example.

The plurality of modes may have a fundamental mode, wherein the phase of the fundamental mode is equal to "0". The features described in this paragraph in combination with one or more of the first example through the thirteenth example form a fourteenth example.

The phase information may have relative phase information with respect to the fundamental mode for each mode of the plurality of modes. The features described in this paragraph in combination with the fourteenth example form a fifteenth example. This has the effect of dispensing with information relating to phase at the input to the neural network. For example, the trained neural network may process amplitude images which may have information regarding amplitudes of the superimposed plurality of light rays and may not have information regarding phases of the superimposed plurality of light rays.

The shifted phase information may have relative phase information with respect to the fundamental mode for each mode of the plurality of modes. The features described in this paragraph in combination with the fourteenth example or the fifteenth example form a sixteenth example.

A system may include a receiving device according to one or more of the first example to the sixteenth example. The system may further include a multimode optical waveguide, and may include a transmitting device configured to provide the plurality of light beams to the multimode optical waveguide, and to provide the plurality of shifted light beams to the multimode optical waveguide. The system described in this paragraph forms a seventeenth example.

The transmitting device may include: a generating device configured to provide the plurality of light beams; a shifting device configured to provide, for each light beam of the plurality of light beams, the respective shifted light beam of the plurality of shifted light beams; and a waveguide interface configured to provide the plurality of light beams to the multimode optical waveguide, and to provide the plurality of shifted light beams to the multimode optical waveguide. The features described in this paragraph in combination with the seventeenth example form an eighteenth example.

The generating device may include an initial light beam generating device and a modulating device, wherein the initial light beam generating device is configured to generate an initial light beam, and wherein the modulating device is configured to generate the plurality of light beams for the initial light beam. The features described in this paragraph in combination with the eighteenth example form a nineteenth example.

The displacement device may include an acousto-optic modulator. The feature described in this paragraph in combination with the eighteenth example or the nineteenth example forms a twentieth example.

A system may include: a transmitting device configured to: provide a plurality of light beams, each light beam of the plurality of light beams including an associated mode of a plurality of modes with an associated amplitude and an associated phase; and for each light beam of the plurality of light beams, provide a shifted light beam, the shifted light beam including the associated mode with the associated amplitude and an associated shifted phase, the shifted phase being different from the phase of the light beam; an optical waveguide configured to transmit the plurality of light beams such that light beams of the plurality of light beams are at least partially superimposed to form a blended light beam, and to transmit the plurality of shifted light beams such that the shifted light beams of the plurality of shifted light beams are at least partially superimposed to form a blended shifted light beam; a receiving device configured to: receive the mixed light beam transmitted from the optical waveguide, and receive the mixed shifted light beam transmitted from the optical waveguide; one or more processors configured to: determine mode information for the received light beam using a trained neural network, the mode information including the associated amplitude and associated phase information for each mode of the plurality of modes; determine shifted mode information for the received shifted light beam using the trained neural network, the shifted mode information for each mode of the plurality of modes having the associated amplitude and associated shifted phase information; determine, for each mode of the plurality of modes, the respective associated phase of the light beam using the associated phase information of the light beam and the associated shifted phase information of the shifted light beam. The system described in this paragraph forms a twenty-first example.

A method for determining transmission characteristics of an optical waveguide may include: providing a blended light beam transmitted by the optical waveguide, the blended light beam including an at least partially superimposed plurality of light beams, each light beam of the plurality of light beams including an associated mode of a plurality of modes having an associated amplitude and an associated phase; determining, by a trained neural network, mode information for the received blended light beam, the mode information including the associated amplitude and associated phase information for each mode of the plurality of modes; providing a blended shifted light beam transmitted by the optical waveguide, the blended shifted light beam including an at least partially superimposed plurality of shifted light beams, each shifted light beam of the plurality of shifted light beams being associated with a light beam of the plurality of light beams, the shifted light beam associated with a respective light beam having the associated mode with the associated amplitude and an associated shifted phase, the shifted phase being different from the phase of the light beam; determining, using the trained neural network, shifted mode information for the intermixed shifted light beam, the shifted mode information having, for each mode of the plurality of modes, the associated amplitude and associated shifted phase information; and determining, for each mode of the plurality of modes, the respective associated phase of the light beam using the associated phase information of the light beam and the associated shifted phase information of the shifted light beam. The method described in this paragraph forms a twenty-second example.

A method for determining transmission characteristics of an optical waveguide may include: receiving a blended light beam from the optical waveguide, the blended light beam including an at least partially superimposed plurality of light beams, each light beam of the plurality of light beams having an associated mode of a plurality of modes having an associated amplitude and an associated phase; determining, using a trained neural network, mode information for the received blended light beam, the mode information for each mode of the plurality of modes including the associated amplitude and associated phase information; receiving a blended shifted light beam from the optical waveguide, the blended shifted light beam including an at least partially superimposed plurality of shifted light beams, each shifted light beam of the plurality of shifted light beams being associated with a light beam of the plurality of light beams, the shifted light beam associated with a respective light beam having the associated mode with the associated amplitude and an associated shifted phase, the shifted phase being different from the phase of the light beam; determining, using the trained neural network, shifted mode information for the intermixed shifted light beam, the shifted mode information having, for each mode of the plurality of modes, the associated amplitude and associated shifted phase information; and determining, for each mode of the plurality of modes, the respective associated phase of the light beam using the associated phase information of the light beam and the associated shifted phase information of the shifted light beam. The method described in this paragraph forms a twenty-third example.

A method for determining transmission characteristics of an optical waveguide may include: transmitting a plurality of light beams with the optical waveguide, each light beam of the plurality of light beams having an associated mode of a plurality of modes with an associated amplitude and an associated phase, the transmitted light beams being at least partially superimposed to form a mixed light beam; receiving the mixed light beam, the received mixed light beam including the plurality of modes; determining, using a trained neural network, mode information for the received blended light beam, the mode information including, for each mode of the plurality of modes, the associated amplitude and associated phase information; for each light beam of the plurality of light beams, generating a shifted light beam, the shifted light beam including the associated mode having the associated amplitude and an associated shifted phase, the shifted phase of the shifted light beam being different from the phase of the light beam; transmitting said plurality of shifted light beams using said optical waveguide, said transmitted shifted light beams being least partially superimposed to form a mixed shifted light beam; receiving said mixed shifted light beam, said mixed shifted light beam having said plurality of modes; determining, using the trained neural network, shifted mode information for the blended shifted light beam, the shifted mode information including, for each mode of the plurality of modes, the associated amplitude and associated shifted phase information; and determining, for each mode of the plurality of modes, the respective associated phase of the light beam using the associated phase information of the light beam and the phase information of the associated shifted phase information of the shifted light beam.

An apparatus may be configured to perform the method according to one or more of the twenty-second example to the twenty-fourth example. The apparatus described in this paragraph constitutes a twenty-fifth example.

A computer program product may store program instructions which, when executed, execute the method according to one or more of the twenty-second example to the twenty-fourth example. The computer program product described in this paragraph constitutes a twenty-sixth example.

A method for computer training a neural network may include: providing a plurality of first amplitude images, each first amplitude image of the plurality of first amplitude images being associated with a first plurality of modes, wherein, for each first amplitude image of the plurality of first amplitude images, each mode of the first plurality of modes is associated with a respective amplitude and a respective phase; determining, using the neural network, mode information for each first amplitude image of the plurality of first amplitude images, the mode information including, for each mode of the first plurality of modes, a determined associated amplitude and determined associated phase information; pre-training the neural network, for each first amplitude image of the plurality of first amplitude images, using the amplitudes and phases provided for the first plurality of modes and the amplitudes and phase information determined for the first plurality of modes; providing a plurality of second amplitude images, each second amplitude image of the plurality of second amplitude images having associated therewith a second plurality of modes, the second plurality of modes including the first plurality of modes and at least one additional mode, wherein, for each second amplitude image of the plurality of second amplitude images, each mode of the second plurality of modes has associated therewith a respective amplitude and a respective phase; determining, using the neural network, mode information for each second amplitude image of the plurality of second amplitude images, the mode information having, for each mode of the second plurality of modes, a determined associated amplitude and determined associated phase information; and training the neural network, for each second amplitude image of the plurality of second amplitude images, using the amplitudes and phases provided for the second plurality of modes and the amplitudes and phase information determined for the second plurality of modes. The method described in this paragraph forms a twenty-seventh example.

A training device may be configured to perform the method according to the twenty-seventh example. The training device described in this paragraph constitutes a twenty-eighth example.

A computer program product may store program instructions which, when executed, execute the method according to the twenty-seventh example. The computer program product described in this paragraph constitutes a twenty-ninth example.

A transmitting device may include: a light beam generating device configured to provide a plurality of light beams, each light beam of the plurality of light beams having an associated mode of a plurality of modes having an associated amplitude and an associated phase; a displacement device configured to provide, for each light beam of the plurality of light beams, a respective displaced light beam, the displaced light beam associated with a respective light beam having the associated mode with the associated amplitude and an associated displaced phase, the displaced phase being different from the phase of the light beam; and a waveguide interface configured to provide the plurality of light beams to a multimode optical waveguide and to provide the plurality of shifted light beams to the multimode optical waveguide. The transmitting device described in this paragraph forms a thirtieth example.

In the following detailed description, reference is made to the accompanying drawings which form a part thereof and in which are shown, by way of illustration, specific embodiments in which the invention may be practiced.

The term "processor" may be understood as any type of entity that allows processing of data or signals. For example, the data or signals may be handled according to at least one (i.e., one or more than one) specific function performed by the processor. A processor may include or be formed from an analog circuit, a digital circuit, a mixed signal circuit, a logic circuit, a microprocessor, a central processing unit (CPU), a graphics processing unit (GPU), a digital signal processor (DSP), a programmable gate array (FPGA), an integrated circuit, or any combination thereof. Any other method of implementing the respective functions, described in more detail below, may also be understood to include a processor or logic circuit. It is understood that one or more of the method steps described in detail herein may be performed (e.g., implemented) by a processor, through one or more specific functions performed by the processor. The processor may therefore be configured to perform any of the information processing methods or components thereof described herein.

Attackers can access transmitted data using various methods. For example, to increase information security, physical layer security can be provided, such as in a data transmission of light using a multi-mode optical waveguide. In such cases, it is, however, necessary to determine the transmission characteristics of the multi-mode optical waveguide. Various embodiments concern a receiving device and a method by which the transmission characteristics of an optical waveguide are efficiently determined by determining the amplitudes and the magnitudes of the phases of transmitted light beams using a neural network and by determining the respective signs of the phases using phase-shifted light beams.

FIG. 1A illustrates a receiving device 100 according to various embodiments. The receiving device 100 may include a waveguide interface 102. The waveguide-interface 102 may be configured to receive at least one light beam from an optical waveguide. For example, the waveguide interface 102 may be configured to receive at least one light beam from a multimode optical waveguide. For example, a multimode waveguide may be configured to transmit a plurality of light beams with a respective mode. Illustratively, the multimode waveguide may transmit light beams having a plurality of modes. The multimode waveguide may further be configured to transmit the plurality of light beams such that the light beams of the plurality of light beams at least partially overlap. For example, the multimode waveguide may illustratively superimpose the plurality of light beams and provide a blended light beam to the receiving device 100.

According to various embodiments, the waveguide interface 102 may be configured to receive a blended light beam 104, such as from a multimode optical waveguide. The intermixed light beam 104 may include an at least partially superimposed plurality of light beams. For example, the multimode optical waveguide may superimpose the plurality of light beams during transmission to form the blended light beam 104. Each light beam of the plurality of light beams may have an associated mode of a plurality of modes (e.g., more than three modes, e.g., more than five modes, e.g., more than ten modes, e.g., more than 25 modes, e.g., more than 50 modes, e.g., more than 55 modes, e.g., in a range of 50 to 100 modes). For example, each light beam of the plurality of light beams may uniquely/e.g., bijectively) have one mode of the plurality of modes. The mixed light beam 104 may have a mixture of modes. For example, each light beam of the plurality of light beams may have a mode of the plurality of modes, the mode being different from the other modes of the plurality of modes. Each mode of the plurality of modes may have an associated amplitude and an associated phase (e.g., optical phase) of the respective light beam of the plurality of light beams. Illustratively, each light beam of the plurality of light beams may have an associated amplitude and an associated phase, wherein the associated amplitudes and/or the associated phases of one or more light beams of the plurality of light beams are different from those of the other light beams of the plurality of light beams. Illustratively, the light beams of the plurality of light beams may have different amplitudes and/or different phases.

According to various embodiments, the plurality of light beams may have a fundamental mode. For example, one light beam of the plurality of light beams may have the fundamental mode. The phase of the fundamental mode may be equal to "0".

According to various embodiments, the waveguide interface 102 may be configured to receive a blended, shifted light beam 106, such as from the multimode optical waveguide. The intermixed shifted light beam 106 may include an at least partially superimposed plurality of shifted light beams. For example, the multimode optical waveguide may superimpose the plurality of shifted light beams during transmission to form the blended shifted light beam 106. Each shifted light beam of the plurality of shifted light beams may be associated with a light beam of the plurality of light beams. For example, each shifted light beam of the plurality of shifted light beams may be associated with exactly one light beam of the plurality of light beams (e.g., bijectively). The shifted light beam associated with a respective light beam of the plurality of light beams may have the associated mode of the plurality of modes. The shifted light beam associated with a respective light beam of the plurality of light beams may have the associated amplitude of the light beam for the associated mode. For example, the amplitude of a shifted light beam of the plurality of shifted light beams may substantially correspond to the amplitude of the associated light beam. The shifted light beam associated with a respective light beam of the plurality of light beams may have an associated shifted phase of the shifted light beam for the associated mode. The shifted phase of a respective shifted light beam may be different from the phase of the associated light beam. Illustratively, a respective shifted light beam of the plurality of shifted light beams may be out of phase with respect to the associated light beam.

Each light beam of the plurality of light beams may have a first frequency. Each shifted light beam of the plurality of shifted light beams may have a second frequency, different from the first frequency of the associated light beam.

According to various embodiments, the receiving device 100 may include one or more processors 108. The one or more processors 108 (referred to in various aspects as processor 108) may include any type of logic-implementing entity as described above. The processor 108 may implement logic using a memory device, for example, and/or may process data using the memory device.

The processor 108 may implement a trained neural network 110. The processor 108 may be configured to process the blended light beam 104 received from the waveguide interface 102. The processor 108 may be configured to process the intermixed shifted light beam 106 received from the waveguide interface 102. The processor 108 may be configured to process the received intermixed light beam 104 and/or the received intermixed shifted light beam 106 using the trained neural network 110.

The trained neural network 110 may be configured to determine mode information 114 for the intermixed light beam 104. The mode information 114 may include associated amplitude and associated phase information for each mode of the plurality of modes. The respective phase information may characterize the associated phase of the respective light beam of the plurality of light beams. Illustratively, light beams having a respective amplitude and a respective phase may be sequentially generated and transmitted using an optical waveguide, and the mixed light beam 104 may be evaluated using the trained neural network 110.

The trained neural network 110 may be configured to determine shifted mode information 116 for the intermixed shifted light beam 106. The shifted mode information 116 may include associated amplitude and associated shifted phase information for each mode of the plurality of modes. The respective shifted phase information may characterize the associated shifted phase of the respective shifted light beam of the plurality of shifted light beams.

As described above, the plurality of light beams may include a fundamental mode. According to various embodiments, the phase information of a respective light beam may be relative phase information with respect to the fundamental mode. The shifted phase information of a respective shifted light beam may be relative shifted phase information with respect to the fundamental mode.

The processor 108 may be configured to determine the associated phase 118 for each light beam of the plurality of light beams. The processor 108 may be configured to determine the associated phase 118 for each light beam of the plurality of light beams using the associated phase information of the respective light beam and the associated shifted phase information of the shifted light beam associated with the respective light beam.

According to various embodiments, the phase information of a respective light beam of the plurality of light beams may have a cosine value of the associated phase. The shifted phase information of a respective shifted light beam of the plurality of shifted light beams may have a cosine value of the associated shifted phase. According to various embodiments, the processor 108 may be configured to determine the associated phase 118 for each light beam of the plurality of light beams using the respective cosine value of the associated phase of the light beam and the respective cosine value of the associated shifted phase of the shifted light beam. The processor 108 may be configured to determine the associated phase 118 for each light beam of the plurality of light beams using a change in direction between the cosine value of the associated phase of the respective light beam and the cosine value of the associated shifted phase of the respective shifted light beam. Illustratively, the shifted phase of the respective shifted light beam may be turned (e.g., rotated) with respect to the respective phase, and the change in direction may be a direction of the rotation. The processor 108 may be configured to determine the associated phase 118 of a respective light beam using the arc cosine function. The processor 108 may be configured to determine the associated shifted phase of a respective shifted light beam using the arc cosine function. The change in direction between the cosine value of the associated phase of the respective light beam and the cosine value of the associated shifted phase of the respective shifted light beam may indicate the sign of the arc cosine function. Illustratively, the change in direction may have a positive direction or a negative direction, where the positive direction may indicate a positive sign and the negative direction may indicate a negative sign.

Figure 1B:
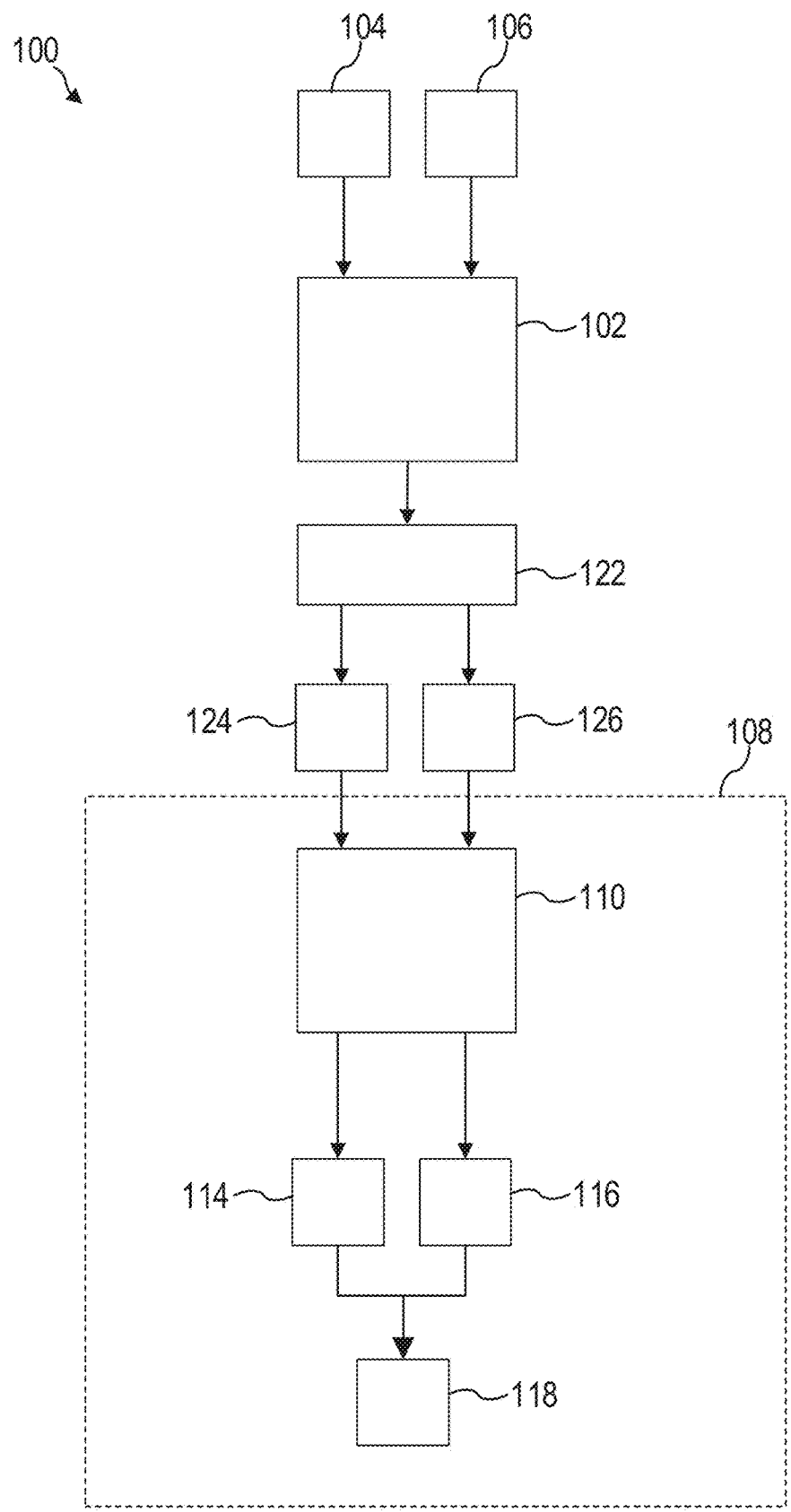

FIG. 1B illustrates a receiving device 100 according to various embodiments, wherein the receiving device 100 may further include an imaging device 122. According to various embodiments, the imaging device 122 may include one or more cameras.

The imaging device 122 may be configured to provide light image data 124 for the received blended light beam 104. The light image data 124 (referred to in some aspects as amplitude images) may have real-value intensity distributions. The intensity distributions may have a distribution of the intensity of the light beams of the superimposed plurality of light beams. Illustratively, the intensity distributions may characterize the associated amplitudes of the light rays of the superimposed plurality of light rays.

According to various embodiments, the trained neural network 110 may be configured to determine the mode information 114 for the light image data 124.

The imaging device 122 may be configured to provide shifted light image data 126 for the received intermixed shifted light beam 106. The shifted light image data 126 may have real-value shifted intensity distributions. The shifted intensity distributions may have a distribution of the intensity of the shifted light beams of the superimposed plurality of shifted light beams. Illustratively, the shifted intensity distributions may characterize the associated amplitudes of the light rays of the superimposed plurality of shifted light rays. According to various embodiments, the trained neural network 110 may be configured to determine the shifted mode information 116 for the shifted light image data 126.

Figure 2:
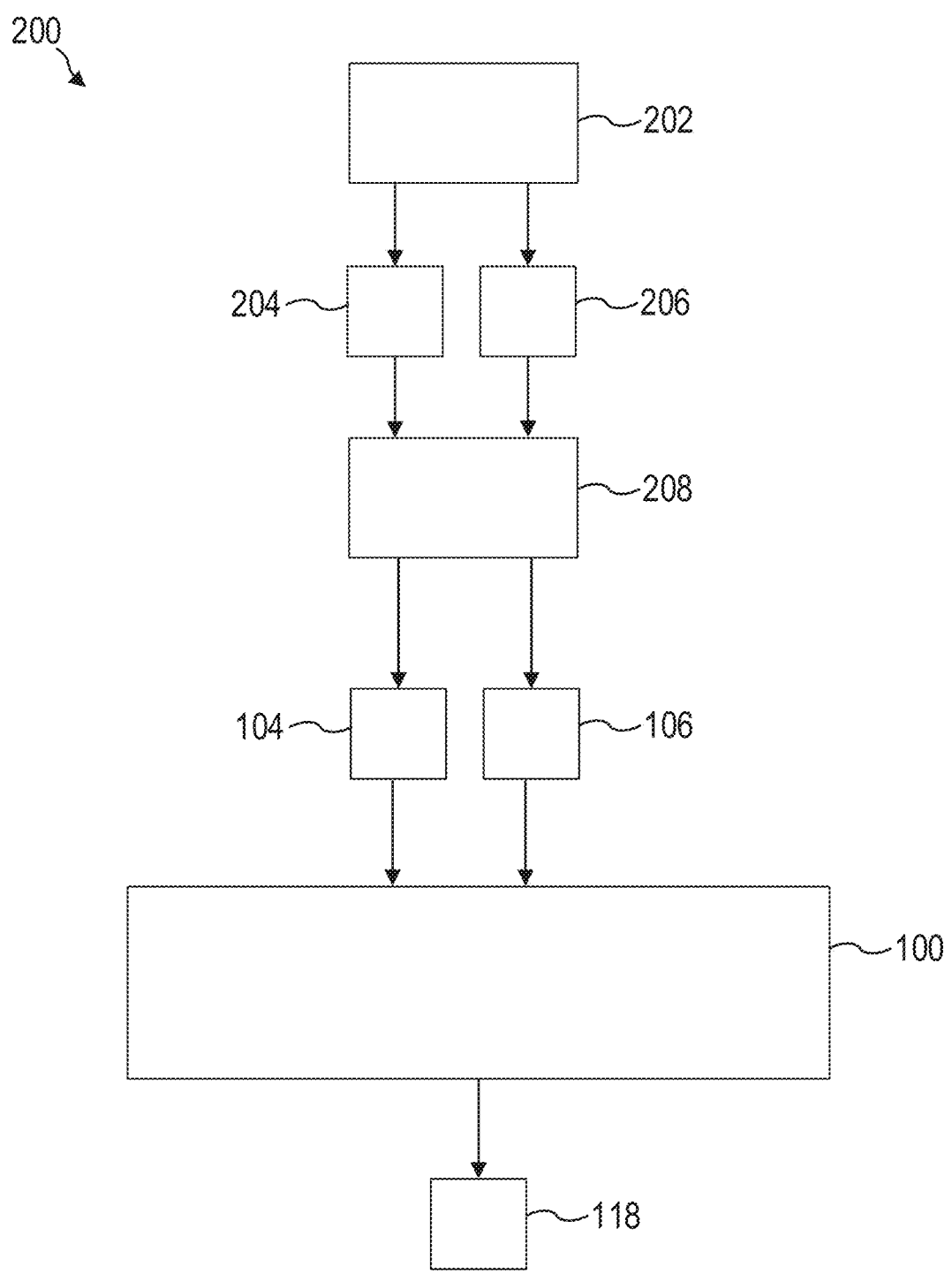
FIG. 2 shows a system according to various embodiments.

FIG. 2 illustrates a system 200 according to various embodiments. The system 200 may include the receiving device 100. The system 200 may further include a multimode optical waveguide 208.

The system 200 may include a transmitting device 202. The transmitting device 202 may be configured to provide a plurality of light beams 204 to the multimode optical waveguide 208. The transmitting device 202 may be configured to provide a plurality of shifted light beams 206 to the multimode optical waveguide 208.

The multimode optical waveguide 208 may be configured to transmit the plurality of light beams 204. The multimode optical waveguide 208 may be configured to provide the mixed light beam 104 for the plurality of light beams 204 to the receiving device 100. The multimode optical waveguide 208 may be configured to transmit the plurality of shifted light beams 206. The multimode optical waveguide 208 may be configured to provide the intermixed shifted light beam 106 for the plurality of shifted light beams 206 to the receiving device 100.

Figure 3A:
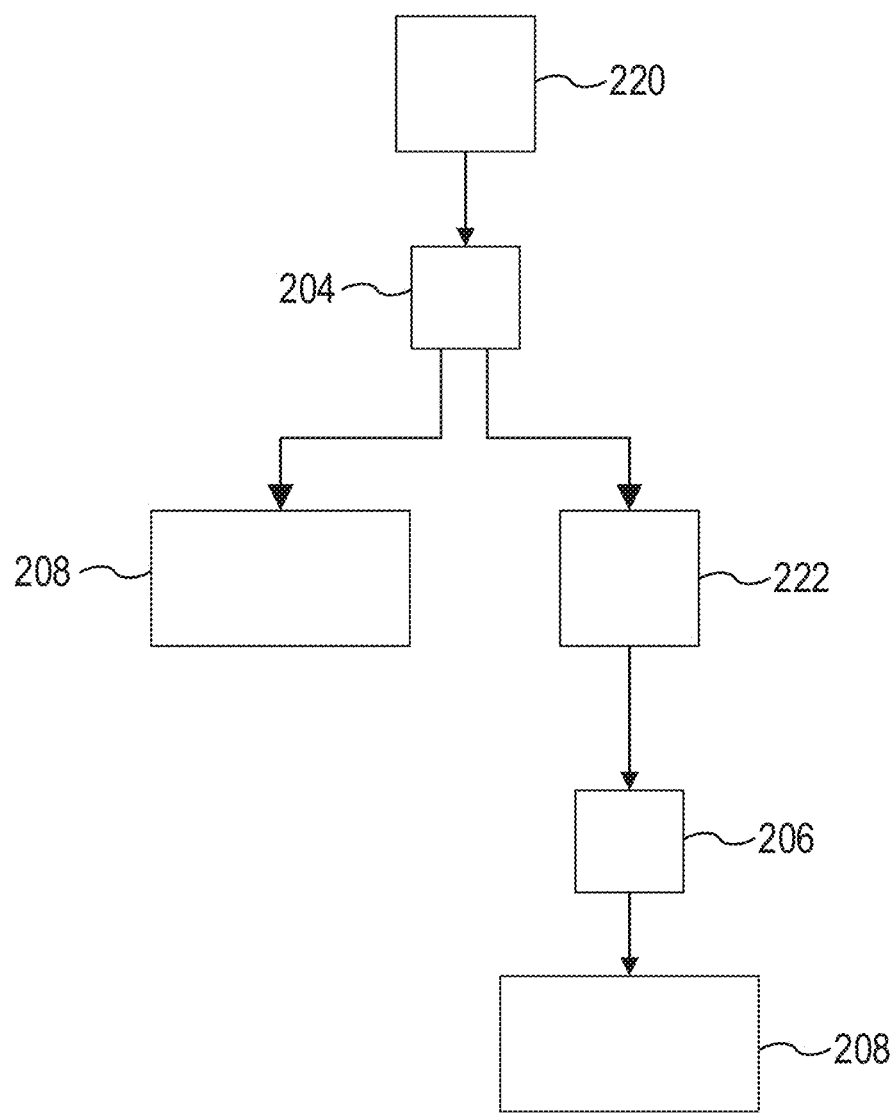
FIGS. 3A and 3B show a transmitting device according to various embodiments.
Figure 3B:
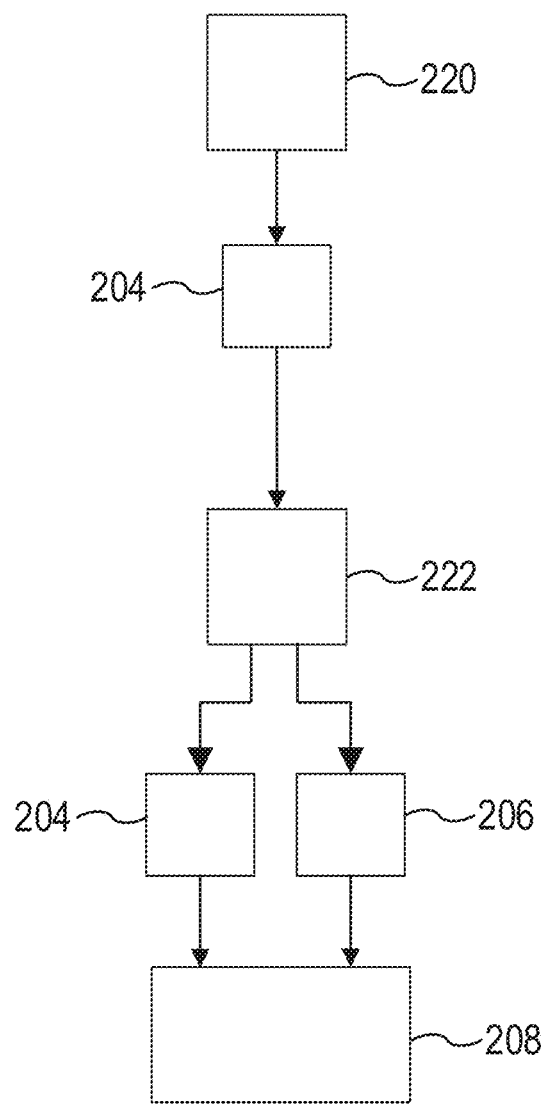

FIG. 3A shows a transmitting device 202A according to various embodiments, and FIG. 3B shows a transmitting device 202B according to various embodiments. For example, the transmitting device 202 may be configured according to the transmitting device 202A or the transmitting device 202B.

The transmitting device 202 may include a generating device 220. The generating device 220 may be configured to provide the plurality of light beams 204. The transmitting device 202 may include a shifting device 222. The displacement device 222 may be configured to provide, for each light beam of the plurality of light beams 204, the respective displaced light beam of the plurality of displaced light beams 206. Illustratively, the shifting device 222 may phase shift a light beam (e.g., by about 1 MHz, e.g., by more than 1 MHz). For example, the shifting device 222 may include an acousto-optic modulator. According to various embodiments, the shifting device 222 may be configured to shift a light beam such that the wavelength of the light beam remains substantially unchanged.

The generation device 220 may be configured to provide the plurality of light beams 204 directly (for example, as in FIG. 3A) or indirectly (for example, as in FIG. 3B) to the multimode optical waveguide 208. For example, the generation device 220 may provide the plurality of light beams 204 directly to the multimode optical waveguide 208 or the generation device 220 may provide the plurality of light beams 204 indirectly to the multimode optical waveguide 208 using the displacement device 222 (for example, as in FIG. 3B). For example, the generation device 220 may provide the plurality of light beams 204 to the displacement device 222 and the displacement device 222 may provide the plurality of light beams 204 (e.g., without phase shifting the light beams of the plurality of light beams 204) to the multimode optical waveguide 208.

Figure 4:
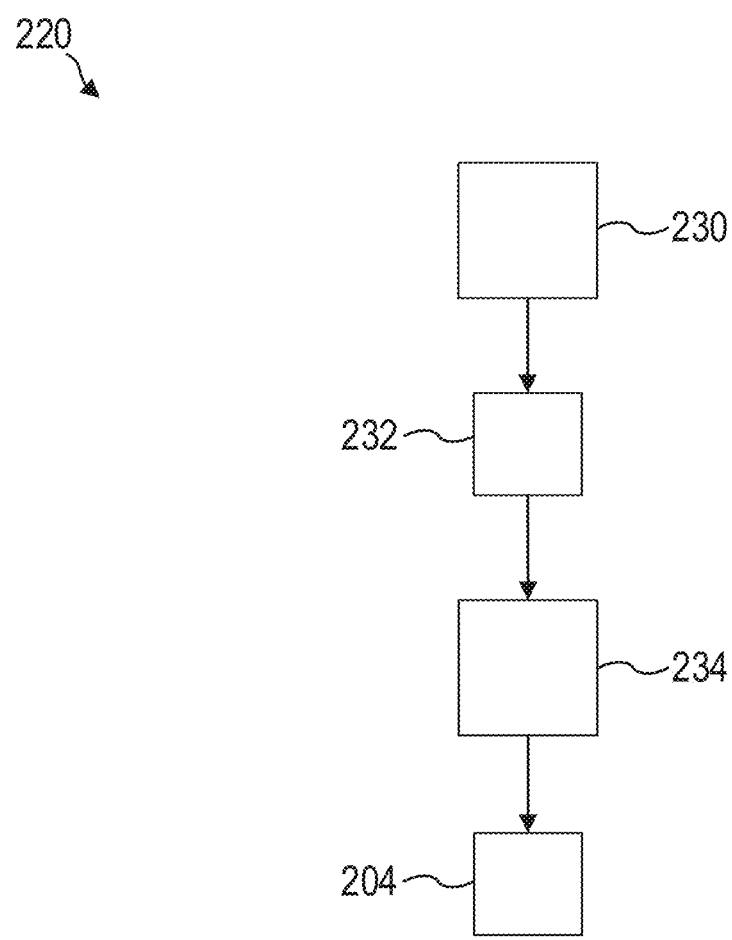
FIG. 4 shows a generation device according to various embodiments.

FIG. 4 shows a generation device 220 according to various embodiments.

The generation device 220 may include an initial light beam generating device 230. The initial light beam generating device 230 may be configured to generate an initial light beam 232.

The generating device 220 may include a modulation device 234. The modulation device 234 may be configured to generate the plurality of light beams 204 for the initial light beam 232.

FIG. 5 illustrates a system 500 according to various embodiments. The system 500 may include the transmitting device 202. The initial light beam generating device 230 may generate and initial light beam 232. The transmitting device 202 may include, for example, a beam splitter 502. The beam splitter 502 may be, for example, a 50:50 beam splitter. The beam splitter 502 may be configured to provide at least a portion of the initial light beam 232 to the displacement device 222. The beam splitter 502 may be configured to provide at least a portion of the initial light beam 232 to the modulation device 234. Each light beam of the plurality of light beams 204 may have the associated mode of the plurality of modes 504. For example, the plurality of modes 504 may have a number, N, of modes, where N may be any natural integer. As described above, the plurality of light beams may have the fundamental mode, where the phase of the fundamental mode may be equal to "0". The phase information of a light beam of the plurality of light beams 204 may be relative phase information with respect to the fundamental mode. In the case where the fundamental mode is equal to "0", the neural network 110 may be configured to determine a number, N−1, of phase information and/or to determine a number, N, of amplitudes.

The system 500 may further include the multimode optical waveguide 208 for transmitting the plurality of light beams 204 and providing the mixed light beam 104 to the receiving device 100. The multimode optical waveguide 208 may further transmit the plurality of shifted light beams 206 and provide the mixed shifted light beam 106 to the receiving device 100.

The receiving device 100 may be configured to determine mode information 114 for each light beam of the plurality of light beams 204. The mode information 114 may include, for each light beam of the plurality of light beams 204, the associated amplitude ("$Amp_N$") and the associated phase information ("$Phase_{N1}$").

The receiving device 100 may be configured to determine the shifted mode information 116 for each shifted light beam of the plurality of shifted light beams 206. The shifted mode information 116 may include, for each shifted light beam of the plurality of shifted light beams 206, the associated amplitude ("$Amp_N$") and the associated shifted phase information ("$Phase_{N2}$").

The receiving device 100 may be configured to determine the associated phase ("$Phase_N$") for each light beam of the plurality of light beams 204. Illustratively, by determining the associated amplitude ("$Amp_N$") and the associated phase ("$Phase_N$") of a respective light beam of the plurality of light beams 204, the receiving device 100 may determine the transmission matrix (referred to in some aspects as the "complex-value transmission matrix") of the multimode optical waveguide 208. Determining the transmission matrix may have or be an intensity-based mode decomposition.

Determining the transmission matrix may be calibrating the multimode optical waveguide 208.

FIG. 6 illustrates a method 600 for determining transmission characteristics of an optical waveguide according to various embodiments.

The method 600 may include providing a mixed light beam transmitted using the optical waveguide (e.g., a multimode optical waveguide). The method 600 may include receiving the mixed light beam from the optical waveguide (in 602). The intermixed light beam may have an at least partially superimposed plurality of light beams. Each light beam of the plurality of light beams may have an associated mode of a plurality of modes with an associated amplitude and an associated phase.

The method 600 may include determining mode information for the received intermixed light beam using a trained neural network (at 604). The mode information may include associated amplitude and associated phase information for each mode of the plurality of modes.

The method 600 may include providing a blended shifted light beam transmitted by the optical waveguide. The method 600 may include receiving the mixed shifted light beam from the optical waveguide (at 606). The intermixed shifted light beam may include an at least partially superimposed plurality of shifted light beams. Each shifted light beam of the plurality of shifted light beams may be associated with a light beam of the plurality of light beams. Each shifted light beam of the plurality of shifted light beams may have the associated mode of the plurality of modes with the associated amplitude and an associated shifted phase.

The method 600 may include determining shifted mode information for the received intermixed shifted light beam using the trained neural network (in 608). The shifted mode information may include associated amplitude and associated shifted phase information for each mode of the plurality of modes.

The method 600 may further include, for each mode of the plurality of modes, determining the respective associated phase of the light beam using the associated phase information of the light beam and the associated shifted phase information of the shifted light beam (in 610).

According to various embodiments, the method 600 for determining transmission characteristics of the optical waveguide may be a method for calibrating the optical waveguide.

Figure 7A:
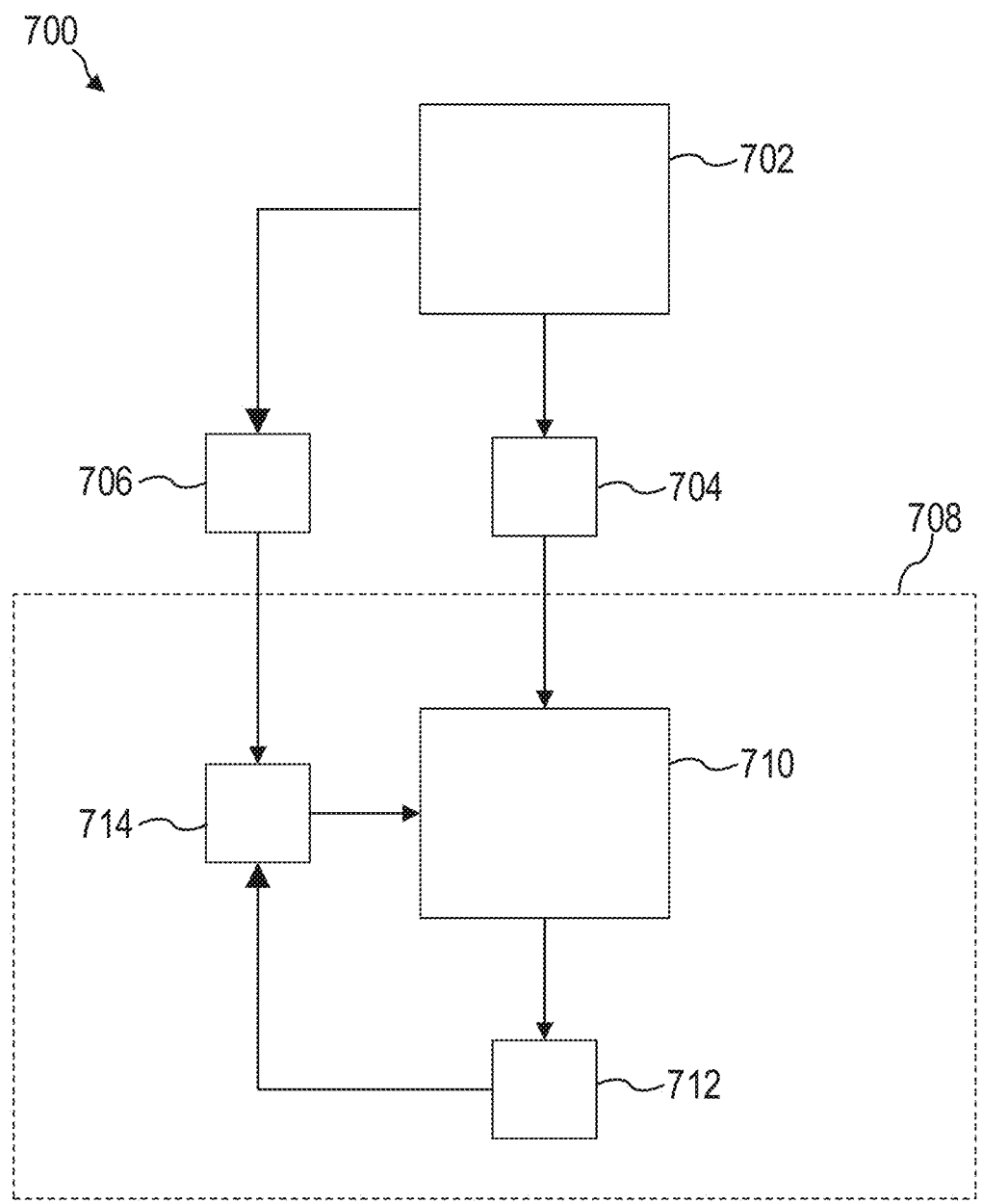
FIGS. 7A and 7B show a training device according to various embodiments.
Figure 7B:
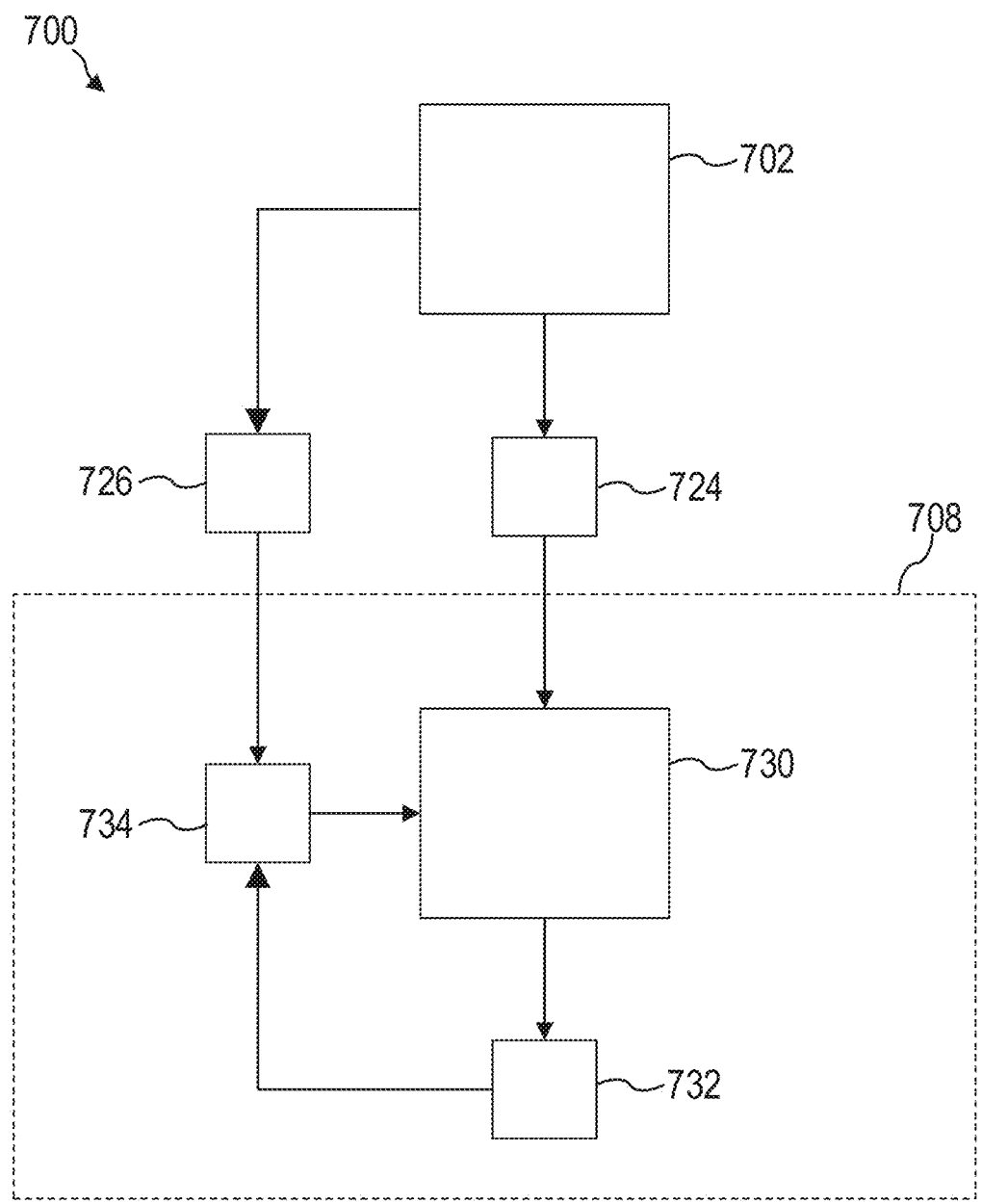

FIG. 7A and FIG. 7B illustrate a training device 700 according to various embodiments. The training device 700 may be configured to train a neural network. Illustratively, the training device 700 may train a neural network to provide a trained neural network, such as the trained neural network 110.

The training device 700 may include a memory device 702. The memory device 702 may include at least one memory. The memory may be used, for example, in a data processing performed by a processor. A memory used in the embodiments may be a volatile memory, for example, a DRAM (dynamic random access memory), or a non-volatile memory, for example, a PROM (programmable read-only memory), an EPROM (erasable PROM), an EEPROM (electrically erasable PROM), or a flash memory, such as a floating gate memory device, a charge trapping memory device, an MRAM (magnetoresistive random access memory), or a PCRAM (phase change random access memory). The memory device 702 may be configured to store data, such as one or more amplitude images and/or one or more pieces of information associated with amplitude images. The memory device 702 may be configured to store code (e.g., program code), such as to implement a neural network.

With reference to FIG. 7A, the storage device 702 may store a plurality of first amplitude images 704. Each first amplitude image of the plurality of first amplitude images 704 may have a real-value intensity distribution. The intensity distribution may have a distribution of intensity of the superimposed light beams. For example, when transmitting a plurality of light beams having different amplitudes from each other using an optical waveguide, the plurality of light beams may overlap to provide an intensity distribution. According to various embodiments, the first amplitude images of the plurality of first amplitude images 704 may be measured and/or may be generated (for example, using a computer program, such as using another neural network).

Each first amplitude image of the plurality of first amplitude images 704 may have a first plurality of modes associated therewith. For example, the first plurality of modes may have a first number, M, of modes, where M may be any natural integer. For each first amplitude image of the plurality of first amplitude images 704, an amplitude may be associated with each mode of the first plurality of modes. For each first amplitude image of the plurality of first amplitude images 704, a phase may be associated with each mode of the first plurality of modes. According to various embodiments, for each first amplitude image of the plurality of first amplitude images 704, the storage device 702 may store information 706 relating to the respective amplitude and/or the respective phase of a mode of the first plurality of modes.

The training device 700 may further include one or more processors 708. The one or more processors 708 (referred to in some aspects as processor 708) may be any type of circuitry, i.e., any type of logic-implementing entity, as described above. In various embodiments, the one or more processors 708 may be configured to correspond to the one or more processors 108 of the receiving device 100.

The processor 708 may be configured to implement a neural network 710. The neural network 710 may be configured to determine mode information 712 for each first amplitude image of the plurality of first amplitude images 704. The mode information 712 of a respective first amplitude image may have a determined associated amplitude for each mode of the first plurality of modes. The mode information 712 of a respective first amplitude image may have determined associated phase information for each mode of the first plurality of modes. For example, the determined associated phase information of a respective mode may have a cosine value of the phase associated with the mode.

The processor 708 may be configured to compare, for each first amplitude image of the plurality of first amplitude images 704, the phase information determined for each mode of the first plurality of modes with the respective associated phase (e.g., using the information 706). For example, the processor 708 may be configured to compare the cosine value of the phase of a respective mode determined using the neural network 710 with the associated phase. According to various embodiments, the processor 708 may calculate an error of the determined phase information (for example, using a loss function).

The processor 708 may be configured to train the neural network 710 based on the comparison (for example, based on the loss function). For example, the processor 708 may train the neural network 710 such that the determined error is reduced (for example, minimized).

According to various embodiments, the training of the neural network 710 using the plurality of first amplitude images 704 may be a pre-training of the neural network 710. For example, the neural network 710 that is trained using the plurality of first amplitude images 704 may be a pre-trained neural network.

With reference to FIG. 7B, the neural network 710 that is trained using the plurality of first amplitude images 704 may be a pre-trained neural network 730.

The storage device 702 may further store a plurality of second amplitude images 724. Each second amplitude image of the plurality of second amplitude images 724 may have a real-value intensity distribution. According to various embodiments, the second amplitude images of the plurality of second amplitude images 724 may be measured and/or may be generated.

Each second amplitude image of the plurality of second amplitude images 724 may have a second plurality of modes associated therewith. The second plurality of modes may have, for example, a second number, N, of modes, where N may be any natural integer. The second number, N, of modes may be greater than the first number, M, of modes. According to various embodiments, the second plurality of modes may include the first plurality of modes and at least one additional mode. For example, the first number, M, of modes may have three modes and the second number, N, of modes may have five modes. For example, the first number, M, of modes may have five modes and the second number, N, of modes may have ten modes. For example, the first number, M, of modes may have twenty modes and the second number, N, of modes may have fifty modes. For example, the first number, M, of modes may have fifty modes and the second number, N, of modes may have more than one hundred modes. According to various embodiments, the second number, N, of modes may be a multiple of the first number, M, of modes. For example, the second number, N, of modes may have twice as many modes as the first number, M, of modes. For example, the second number, N, of modes may have three times as many modes as the first number, M, of modes. For example, the second number, N, of modes may have four times as many modes as the first number, M, of modes.

For each second amplitude image of the plurality of second amplitude images 724, an amplitude may be associated with each mode of the second plurality of modes. For each second amplitude image of the plurality of second amplitude images 724, a phase may be associated with each mode of the second plurality of modes. According to various embodiments, for each second amplitude image of the plurality of second amplitude images 724, the storage device 702 may store information 726 relating to the respective amplitude and/or the respective phase of a mode of the second plurality of modes.

The processor 708 may be configured to implement a pre-trained neural network 730, such as the neural network 710 trained using the plurality of first amplitude images. The pre-trained neural network 730 may be configured to determine mode information 732 for each second amplitude image of the plurality of second amplitude images 724. The mode information 732 of a respective second amplitude image may have a determined associated amplitude for each mode of the second plurality of modes. The mode information 732 of a respective second amplitude image may have determined associated phase information for each mode of the second plurality of modes. For example, the determined associated phase information of a respective mode may have a cosine value of the phase associated with the mode.

The processor 708 may be configured to compare, for each second amplitude image of the plurality of second amplitude images 724, the phase information determined for each mode of the second plurality of modes with the respective associated phase (e.g., using the information 726). For example, the processor 708 may be configured to compare the cosine value of the phase of a respective mode determined using the pre-trained neural network 730 with the associated phase. According to various embodiments, the processor 708 may calculate an error of the determined phase information (for example, using a loss function).

The processor 708 may be configured to train the pre-trained neural network 730 based on the comparison (for example, based on the loss function). For example, the processor 708 may train the pre-trained neural network 730 such that the determined error is reduced (for example, minimized).

According to various embodiments, the pre-training of the neural network 710 (e.g., to generate the pre-trained neural network 730) may be for a number of N=5 modes of the first plurality of modes. For example, the plurality of first amplitude images may include 200,000 amplitude images. According to various embodiments, the neural network 710 may have been pre-trained using 199,000 amplitude images of the plurality of first amplitude images, and a reliability (e.g., an error value, e.g., an accuracy, etc.) of the pre-trained neural network 730 may have been determined using 1,000 amplitude images of the plurality of first amplitude images.

According to various embodiments, training the pre-trained neural network 730 may be performed for a number of N=10 modes of the second plurality of modes. For example, the plurality of second amplitude images may have 300,000 amplitude images. The amplitude images of the plurality of second amplitude images may be different from the amplitude images of the plurality of first amplitude images. According to various embodiments, the pre-trained neural network 730 may have been trained using 299,000 amplitude images of the plurality of second amplitude images, and a reliability of the trained neural network 730 may have been determined using 1,000 amplitude images of the plurality of second amplitude images.

According to various embodiments, the pre-training and/or the training may be performed using multiple iterations (e.g., more than three iterations, for example, more than ten iterations, e.g., more than fifty iterations, etc.) of the respective processing described above.

According to various embodiments, the trained neural network 730 may be a pre-trained network. Illustratively, the trained neural network 730 may be further trained.

FIG. 8A illustrates an architecture of a neural network 800 according to various embodiments. The neural network 800 architecture may be an exemplary neural network architecture for the neural networks described herein (e.g., neural network 110, neural network 710, and neural network 730, respectively).

The neural network 800 may be configured to process an amplitude image 802. The amplitude image may include an intensity distribution. The amplitude image may be a gray-scale image. The amplitude image 802 may include a dimension of 64×64×1 (e.g., 64×64 pixels). The neural network 800 may be configured, for example, to process amplitude images having a number of N=10 modes and to determine mode information for the N=10 modes.

According to various embodiments, the neural network 800 may include a DenseNet architecture. The DenseNet architecture is described, for example, in Huang et al, "Densely Connected Convolutional Networks," Proceedings of the IEEE conference on computer vision and pattern recognition, 2017. The neural network 800 may be, for example, a convolutional neural network.

FIGS. 8B through 8G respectively show exemplary elements (e.g., structures of individual blocks) of the neural network 800 according to various embodiments.

A detailed description of the operation of known layers or functions of a neural network, such as a convolutional layer, an activation function layer, a normalization layer, a pooling layer, etc., is omitted to prevent the description from being unnecessarily unclear.

Figure 8B:
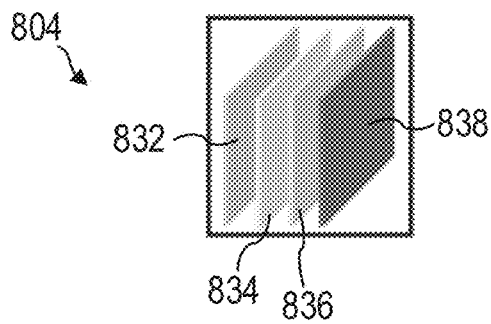
FIGS. 8B to 8G show, respectively, exemplary elements of a neural network according to various embodiments.

The neural network 800 may include a feature block 804. The feature block 804 may be configured to process the amplitude image 802. The feature block 804 may be configured to output a feature map having a dimension of 64×64×64 (referred to in some aspects as a 64×64×64 feature map). A feature map may be a feature vector. An exemplary embodiment of feature block 804 is shown in FIG. 8B. The feature block 804 may include a convolution layer 832. The convolution layer 832 may be a ConV2d layer. The feature block 804 may include a batch normalization layer 834. The batch normalization layer 834 may follow the convolution layer 832. When a layer is referred to as "following" another layer, the layer may process data provided by the other layer. Feature block 804 may include an activation function layer 836. The activation function layer 836 may have an activation function. For example, the activation function may be a Re-LU function (for example, the activation function layer 836 may be a Rectified Linear Unit). The activation function layer 836 may follow the batch normalization layer 834. Feature block 804 may further include a pooling layer 838. The pooling layer 838 may follow the activation function layer 836. The pooling layer 838 may be a max pooling layer.

Figure 8C:
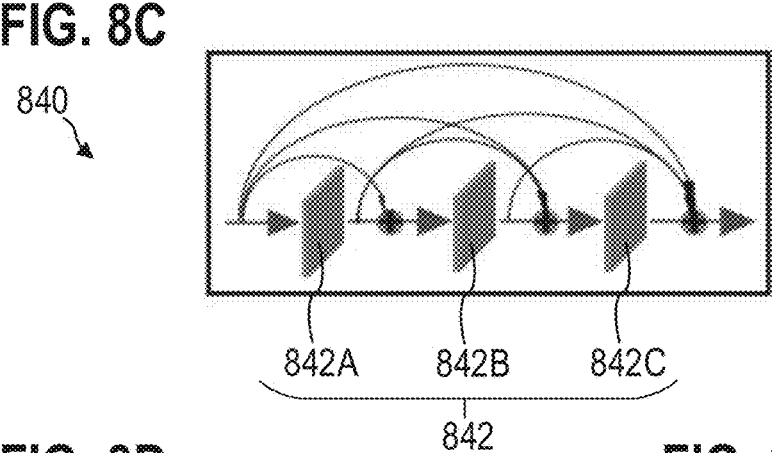
Figure 8D:
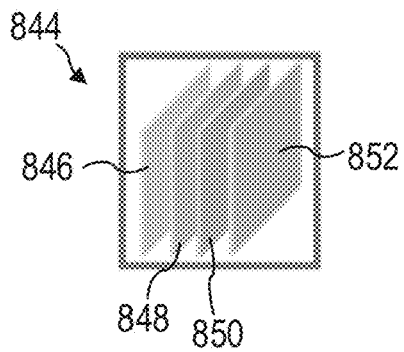
Figure 8E:
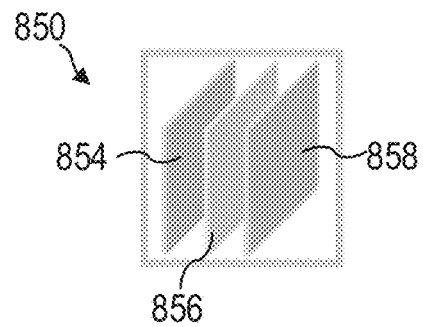

The neural network 800 may include multiple dense blocks. An example of a dense block 840 is shown in FIG. 8C. The dense block 840 may include a plurality of dense layers 842. Each dense layer of the plurality of dense layers 842 may be connected to each subsequent dense layer of the plurality of dense layers in a forward directional manner. For example, a dense layer of the plurality of dense layers may provide data emitted from the layer to each subsequent dense layer of the plurality of dense layers 842. For example, the dense block 840 may have a number, L, of dense layers. A dense layer of the plurality of dense layers 842 may be connected to subsequent dense layers, and a dense block 840 may include a number of: L(L+1)/2 connections. FIG. 8B shows an example of a dense block 840 having three dense layers 842A, 842B, and 843C. Dense layer 842A may be configured to provide data output from the layer to dense layer 842B and to dense layer 842C. The dense layer 842B may be configured to provide the data output from the layer to the dense layer 842C. An example of a dense layer 844 is shown in FIG. 8D. According to various embodiments, dense layer 842A, dense layer 842B, and/or dense layer 842C may be configured according to dense layer 844. According to various embodiments, each dense layer of the plurality of dense layers 842 may be configured according to the dense layer 844. The dense layer 844 may include a batch normalization layer 846. The dense layer 844 may include an activation function layer 848. The activation function layer 848 may include a ReLU activation function. The activation function layer 848 may follow the batch normalization layer 846. The dense layer 844 may further include a bottleneck layer 850. The bottleneck layer 850 may follow the activation function layer 848. The bottleneck layer 850 may be configured to reduce the dimension of the processed data (for example, output from the activation function layer 848). An exemplary bottleneck layer 850 is shown in FIG. 8E. According to various embodiments, bottleneck layer 850 may include a convolution layer 854. The bottleneck layer 850 may further include a batch normalization layer 856. The batch normalization layer 856 may follow the convolution layer 854. Bottleneck layer 850 may include an activation function layer 858. The activation function layer 858 may include a ReLU activation function. The dense layer 844 may further include a convolution layer 852. The convolution layer 852 may follow the bottleneck layer 850.

Figure 8F:
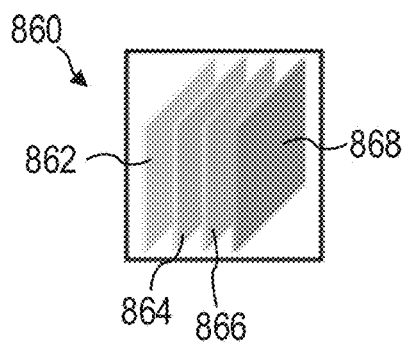

According to various embodiments, the neural network 800 may include a plurality of transition blocks. A transition block may be configured to process data output from a dense block of the plurality of dense blocks and to provide data output from the transition block to a subsequent dense block. Illustratively, a transition block may be disposed between two dense blocks. An example of a transition block 860 is shown in FIG. 8F. The transition block 860 may include a batch normalization layer 862. The transition block 860 may further include an activation function layer 864. The activation function layer 864 may follow the batch normalization layer 862. The activation function layer 864 may include a ReLU activation function. The transition block 860 may include a convolution layer 866. The convolution layer 866 may follow the activation function layer 864. The transition block 860 may have a pooling layer 868. The pooling layer 868 may be an average pooling layer.

With reference to FIG. 8A, the neural network 800 may include a first dense block 806. The first dense block 806 may be configured in accordance with the dense block 840. According to various embodiments, the first dense block 806 may include six dense layers 842. The first dense block 806 may be configured to process the 64×64×64 feature map output from the feature block 804 and to output a 64×64×192 feature map.

The neural network 800 may include a first transition block 808. The first transition block 808 may be configured to correspond to the transition block 860. According to various embodiments, the first transition block 808 may be configured to process the 64×64×192 feature map output from the first dense block 806 and to output a 32×32×96 feature map.

The neural network 800 may include a second dense block 810. The second dense block 810 may be configured in accordance with the dense block 840. According to various embodiments, the second dense block 810 may include twelve dense layers 842. The second dense block 810 may be configured to process the feature map of 32×32×96 features output from the first transition block 808, and to output a feature map of 32×32×384 features.

The neural network 800 may include a second transition block 812. The second transition block 812 may be configured to correspond to the transition block 860. According to various embodiments, the second transition block 812 may be configured to process the feature map of 32×32×384 features output by the second dense block 810 and to output a feature map of 16×16×192 features.

The neural network 800 may include a third dense block 814. The third dense block 814 may be configured in accordance with the dense block 840. According to various embodiments, the third dense block 814 may include twenty-four dense layers 842. The third dense block 814 may be configured to process the feature map of 16×16×192 features output from the second transition block 812, and to output a feature map of 16×16×768 features.

The neural network 800 may include a third transition block 816. The third transition block 816 may be configured to correspond to the transition block 860. According to various embodiments, the third transition block 816 may be configured to process the feature map of 16×16×768 features output by the third dense block 814 and to output a feature map of 8×8×384 features.

The neural network 800 may include a fourth dense block 818. The fourth dense block 818 may be configured in accordance with the dense block 840. According to various embodiments, the fourth dense block 818 may include sixteen dense layers 842. The fourth dense block 818 may be configured to process the feature map of 8×8×384 features output from the third transition block 816, and to output a feature map of 8×8×512 features.

Figure 8G:
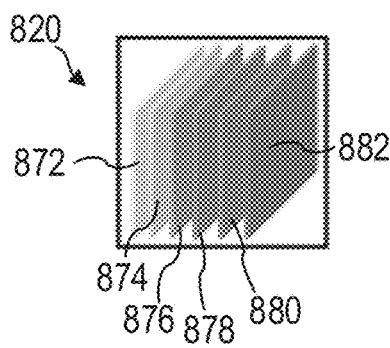

The neural network 800 may further include a regression block 820. An exemplary regression block 820 is shown in FIG. 8G. The regression block 820 may include a batch normalization layer 872. The regression block 820 may further include a first activation function layer 874. The first activation function layer 874 may follow the batch normalization layer 872. The first activation function layer 874 may include a ReLU activation function. The regression block 820 may further include a flattening layer 876. The flattening layer 876 may follow the first activation function layer 874. Illustratively, the flattening layer 876 may be configured to convert the feature map provided by the first activation function layer 874 from a matrix to a row. Illustratively, the flattening layer 876 may be configured to change at least one dimension of the processed feature map to "1". The regression block 820 may further include a first fully connected layer 878. The first fully connected layer 878 may follow the flattening layer 876. Regression block 820 may further include a second fully connected layer 880. The second fully connected layer 880 may follow the first fully connected layer 878. The regression block 820 may further include a second activation function layer 882. The second activation function layer 882 may follow the second fully connected layer 880. The second activation function layer 882 may have a sigmoid activation function (e.g., sigmoidal activation function).

The regression block 820 may be configured to process the data output from the fourth dense block 818. The regression block 820 may be configured to process the feature map of 8×8×512 features output from the fourth dense block 818 and to output a feature map of 1×19 features.

As described above, the processed amplitude image 802 may have N=10 modes, and the neural network 800 may be configured to determine mode information for the N=10 modes. In the case where the fundamental mode is equal to "0", the neural network 800 may be configured to determine a number, N−1, of phase information 824 and to determine a number, N, of amplitudes 822. For example, the neural network 800 may be configured to determine N=10 amplitudes 822 and N−1=9 phase information units 824 for the N=10 modes. According to various embodiments, the 1×19 feature map output from the regression block 820 may include the N=10 amplitudes 822 and the N−1=9 phase information 824. The output feature map with 1×19 features may be a feature vector.

Figure 9:
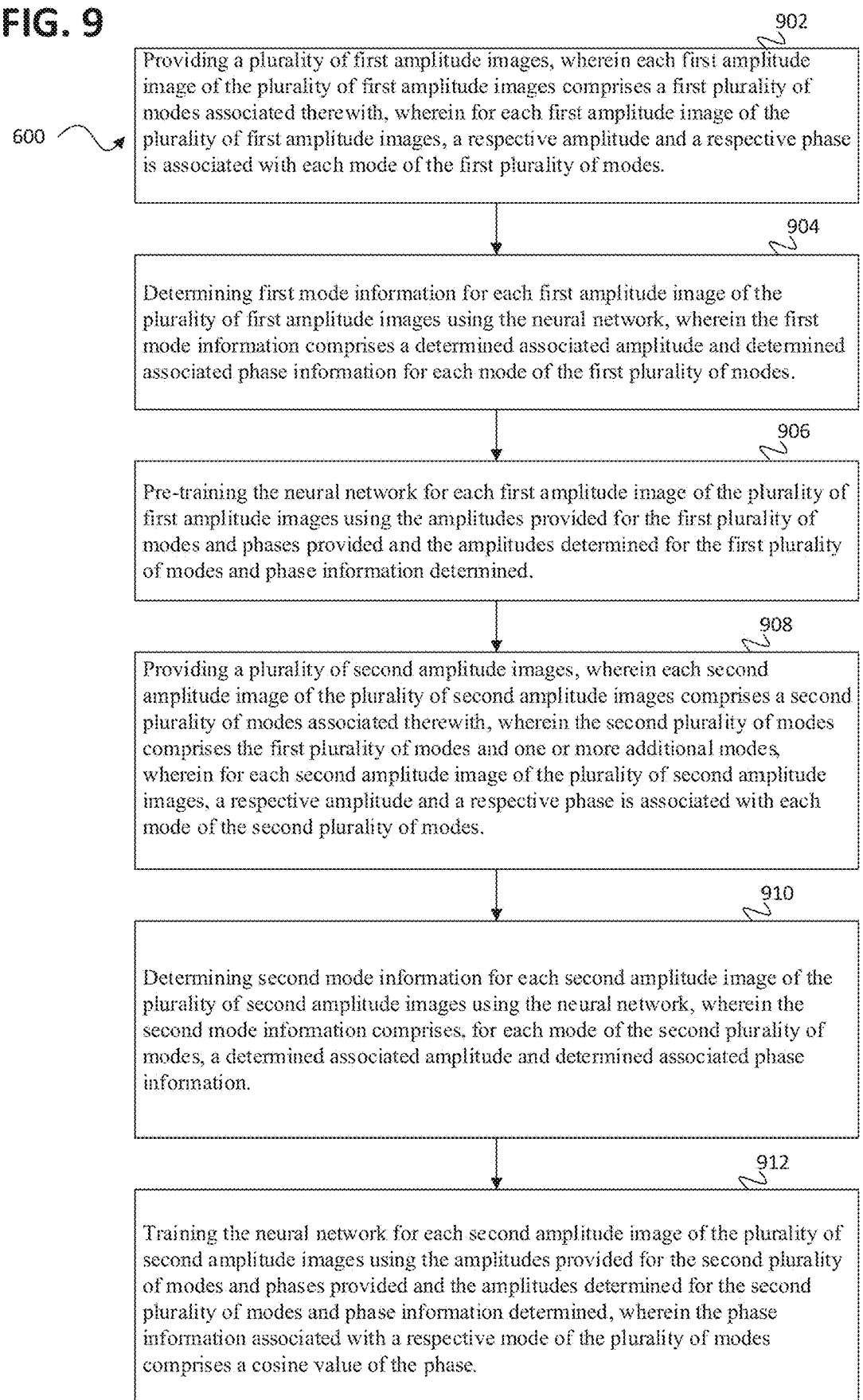
FIG. 9 shows a method for computer-based training of a neural network according to various embodiments.

FIG. 9 illustrates a method 900 for computer-assisted training of a neural network according to various embodiments. According to various embodiments, the method 900 may be a transfer learning method for training a neural network.

The method 900 may include providing a plurality of first amplitude images (at 902). Each first amplitude image of the plurality of first amplitude images may include a first plurality of modes associated therewith. For each first amplitude image of the plurality of first amplitude images, a respective amplitude and a respective phase may be associated with each mode of the first plurality of modes.

The method 900 may include determining first mode information for each first amplitude image of the plurality of first amplitude images using the neural network (at 904). The first mode information may include a determined associated amplitude and determined associated phase information for each mode of the first plurality of modes.

The method 900 may include pre-training the neural network for each first amplitude image of the plurality of first amplitude images using the amplitudes provided for the first plurality of modes and phases provided and the amplitudes determined for the first plurality of modes and phase information determined (in 906). The phase information associated with a respective mode of the plurality of modes may include, for example, a cosine value of the phase.

The method 900 may include providing a plurality of second amplitude images (at 908). Each second amplitude image of the plurality of second amplitude images may include a second plurality of modes associated therewith. The second plurality of modes may include the first plurality of modes and one or more additional modes. For each second amplitude image of the plurality of second amplitude images, a respective amplitude and a respective phase may be associated with each mode of the second plurality of modes.

The method 900 may include determining second mode information for each second amplitude image of the plurality of second amplitude images using the neural network (at 910). The second mode information may include, for each mode of the second plurality of modes, a determined associated amplitude and determined associated phase information.

The method 900 may include training the neural network for each second amplitude image of the plurality of second amplitude images using the amplitudes provided for the second plurality of modes and phases provided and the amplitudes determined for the second plurality of modes and phase information determined (in 912). The phase information associated with a respective mode of the plurality of modes may include, for example, a cosine value of the phase.

What is claimed is:

1. A receiving device, comprising:
a waveguide interface configured to:
receive a blended light beam from a multimode optical waveguide, the blended light beam comprising an at least partially superimposed plurality of light beams, each light beam of the plurality of light beams comprising an associated one of a plurality of modes comprising an associated amplitude and an associated phase;
receive an intermixed shifted light beam from the multimode optical waveguide, the intermixed shifted light beam comprising an at least partially superimposed plurality of shifted light beams, each shifted light beam of the plurality of shifted light beams being associated with a light beam of the plurality of light beams, the shifted light beam associated with a respective light beam having the associated mode with the associated amplitude and an associated shifted phase, the shifted phase being different from the phase of the light beam;

one or more processors configured to:
determine mode information for the mixed light beam using a trained neural network, wherein the mode information comprises associated amplitude and associated phase information for each mode of the plurality of modes;
determine shifted mode information for the intermixed shifted light beam using the trained neural network, the shifted mode information comprising, for each mode of the plurality of modes, the associated amplitude and associated shifted phase information; and
determine, for each mode of the plurality of modes, the respective associated phase of the light beam of the plurality of light beams using the associated phase information of the light beam and the associated shifted phase information of the shifted light beam.

2. The receiving apparatus of claim 1, further comprising an imaging device configured to provide light image data for the received mixed light beam.

3. The receiving apparatus of claim 2, wherein determining mode information for the mixed light beam comprises determining mode information for the light image data using the trained neural network.

4. The receiving device of claim 2, wherein the imaging device is further configured to provide shifted light image data for the received mixed shifted light beam.

5. The receiving apparatus of claim 4, wherein determining shifted mode information for the intermixed shifted light beam comprises determining shifted mode information for the shifted light image data using the trained neural network.

6. The receiving device of claim 1, wherein each light beam of the plurality of light beams has a respective first frequency, and wherein the shifted light beam associated with a respective light beam has a second frequency, the second frequency being different from the first frequency.

7. The receiving device of claim 1, wherein the phase information of a respective light beam of the plurality of light beams comprises a cosine value of the associated phase.

8. The receiving apparatus of claim 1, wherein the shifted phase information of a respective shifted light beam of the plurality of shifted light beams comprises a cosine value of the associated shifted phase.

9. The receiving apparatus of claim 8, wherein determining, for each mode of the plurality of modes, the respectively associated phase of the light beam using the associated phase information of the light beam and the associated shifted phase information of the shifted light beam comprises determining, for each mode of the plurality of modes, the respectively associated phase of the light beam using the cosine value of the associated phase of the light beam and the cosine value of the associated shifted phase of the shifted light beam.

10. The receiving device of claim 9, wherein determining, for each mode of the plurality of modes, the respective associated phase of the light beam using the cosine value of the associated phase of the light beam and the cosine value of the associated shifted phase of the shifted light beam comprises determining, for each mode of the plurality of modes, the respective associated phase of the light beam using a change in direction between the cosine value of the associated phase of the light beam and the cosine value of the associated shifted phase of the shifted light beam.

11. The receiving device of claim 10, wherein the respective assigned phase of the light beam for the cosine value of the assigned phase of the light beam is determined using an arc cosine function, and wherein the change in direction indicates the sign of the arc cosine function.

12. The receiving device of claim 1, wherein the plurality of modes comprises a fundamental mode, wherein a phase of the fundamental mode is equal to "0".

13. The receiving device according to claim 12,
wherein the phase information for each mode of the plurality of modes comprises relative phase information with respect to the fundamental mode; and/or
wherein the shifted phase information for each mode of the plurality of modes has relative phase information with respect to the fundamental mode.

* * * * *